United States Patent [19]
Fitzgerald

[11] Patent Number: 5,798,950
[45] Date of Patent: Aug. 25, 1998

[54] METHOD AND APPARATUS FOR ESTIMATING DURATIONS OF ACTIVITIES IN FORMING A CURRENT SYSTEM, BASED ON PAST DURATIONS OF ACTIVITIES IN FORMING PAST SYSTEMS

[75] Inventor: Joseph Michael Fitzgerald, Austin, Tex.

[73] Assignee: International Business Machines Corporation, Armonk, N.Y.

[21] Appl. No.: 741,733

[22] Filed: Oct. 31, 1996

[51] Int. Cl.$^6$ .................................................. G06F 17/60
[52] U.S. Cl. .................. 364/578; 364/149; 364/468.03; 364/468.06; 705/9; 705/10
[58] Field of Search .................. 364/148, 149, 364/156, 468.03, 468.05, 551.01, 570, 468.15, 468.24, 468.06, 578, 164; 705/7, 8, 9, 10

[56] References Cited

U.S. PATENT DOCUMENTS

| | | | |
|---|---|---|---|
| 4,755,925 | 7/1988 | Tsuchiya et al. | 364/150 |
| 4,998,208 | 3/1991 | Buhrow et al. | 364/512 |
| 5,148,365 | 9/1992 | Dembo | 364/402 |
| 5,150,199 | 9/1992 | Shoemaker et al. | 358/21 R |
| 5,189,606 | 2/1993 | Burns et al. | 364/401 |
| 5,210,704 | 5/1993 | Husseiny | 364/551.01 |
| 5,249,257 | 9/1993 | Akahori et al. | 395/3 |
| 5,291,397 | 3/1994 | Powell | 364/402 |
| 5,309,379 | 5/1994 | Rawlings et al. | 364/578 |
| 5,406,477 | 4/1995 | Harhen | 364/401 |
| 5,465,221 | 11/1995 | Merat et al. | 364/552 |
| 5,465,321 | 11/1995 | Smyth | 395/22 |
| 5,506,783 | 4/1996 | Tanaka et al. | 364/468 |
| 5,619,695 | 4/1997 | Arbabi et al. | 395/670 |
| 5,661,668 | 8/1997 | Yemini et al. | 364/550 |

*Primary Examiner*—Kevin J. Teska
*Assistant Examiner*—Thai Phan
*Attorney, Agent, or Firm*—Anthony V. S. England

[57] ABSTRACT

Durations of activities in forming a system (the "current system") are estimated, using data including i) durations of first activities and scores for a number of previously formed systems (the "past systems"), ii) scores for the current system, and iii) a model defining a relationship between duration of the first activities and such scores. A factor for the model is computed in response to the first activities and scores for the past systems. An expected duration for first activities of the current system is computed in response to the computed factor and the scores for the current system. The scores for such systems are generated by defining and scoring subsystems for the system and combining the scores of the subsystems. Scoring further includes identifying risks having a potential impact on duration of the activities and assigning weights to the risks; identifying a number of possible conditions ("PC's") relating to the risks, associating degrees of the risks with the PC's, such as by ranking the PC's; defining a relation between an expected condition ("EC") and the PC's; and computing a score in response to the EC's, relations between EC's and PC's, the degrees of risks associated with the PC's, such as may be defined by the rank of the PC's and the weights of the risks.

21 Claims, 8 Drawing Sheets

METHOD AND APPARATUS FOR ESTIMATING DURATIONS OF ACTIVITIES IN FORMING A CURRENT SYSTEM, BASED ON PAST DURATIONS OF ACTIVITIES IN FORMING PAST SYSTEMS

FIELD OF THE INVENTION

This invention relates generally to automated prediction as it relates to designing and manufacturing an article of manufacture, and more specifically may concern automated prediction of development process cycle time for an information handling system, including adjusting the development process in response to the prediction.

BACKGROUND OF THE INVENTION AND PRIOR ART

There are a number of methods and systems for predicting and controlling the design and manufacture of complicated products. These include, for example, systems which employ the "critical path method" and the "project evaluation and review technique". See, e.g., Powell, Method for Resource Allocation and Project Control for the Production of a Product, U.S. Pat. No. 5,291,397, dated Mar. 1, 1994.

One problem with these systems is that for complicated products they may require identifying a large number of activities or steps in the design and manufacture process. Furthermore, systems such as these can be extraordinarily complex in that they require not only identifying perhaps thousands, or even tens of thousands of activities, but also identifying certain interrelationships therebetween. Therefore, there exists a need for a possibly less precise, but simpler system for predicting and controlling the time required for designing and manufacturing a complex product.

SUMMARY OF THE INVENTION

An objective of the invention is to control the design or manufacture, i.e., forming, of a product by predicting time required for the design and manufacture so that the product or the manufacturing or design process can be modified to meet constraints.

Another objective of the invention is to use historic durations to make the prediction and required adjustments.

According to the present invention, the foregoing and other objects are attained by estimating durations of activities in forming a system (the "current system"), using data including i) durations of first activities and scores for a number of previously formed systems (the "past systems"), ii) scores for the current system, and iii) a model defining a relationship between duration of the first activities and such scores. A factor for the model is computed in response to the data. An expected duration for the first activities of the current system is computed in response to the data and the factor.

The invention further contemplates that the scores for such systems are generated by defining and scoring subsystems for the system and combining the scores of the subsystems. Scoring further includes identifying risks having a potential impact on duration of the activities and assigning weights to the risks; identifying a number of possible conditions ("PC's") relating to the risks, and associating degrees of the risks with the PC's, such as by ranking the PC's; defining a relation between an expected condition ("EC") and the PC's; and computing a score in response to the EC's, relations between EC's and PC's, the degrees of risks associated with the PC's, such as may be defined by the rank of the PC's and the weights of the risks.

Additional data is used, including i) durations of second activities and scores for a number of previously formed subsystems (the "past subsystems"), ii) scores for the current subsystems, and iii) models defining relationships between duration of the second activities and such subsystem scores. Factors for the models are computed in response to the data, and expected durations for the second activities of the current subsystems in response to the data and the factors.

It is an advantage of the present invention that the forming of the manufactured product may be controlled without performing an exhaustive analysis of individual design and manufacturing steps and their interrelationships.

Additional objects, advantages, and novel features are set forth in the following description, or will be apparent to those skilled in the art or those practicing the invention. Other embodiments are within the spirit and scope of the invention. These objects and embodiments may be achieved by the combinations pointed out in the appended claims. The invention is intended to be limited only as defined in the claims.

DETAILED DESCRIPTION OF THE PREFERRED EMBODIMENT

To clearly point out novel features of the present invention, the following discussion omits or only briefly describes conventional features of the design and manufacturing of information handling systems, and other complex products which are apparent to those skilled in the art. It is assumed that those skilled in the art are familiar with planning and scheduling of such systems and articles.

Figure 8:
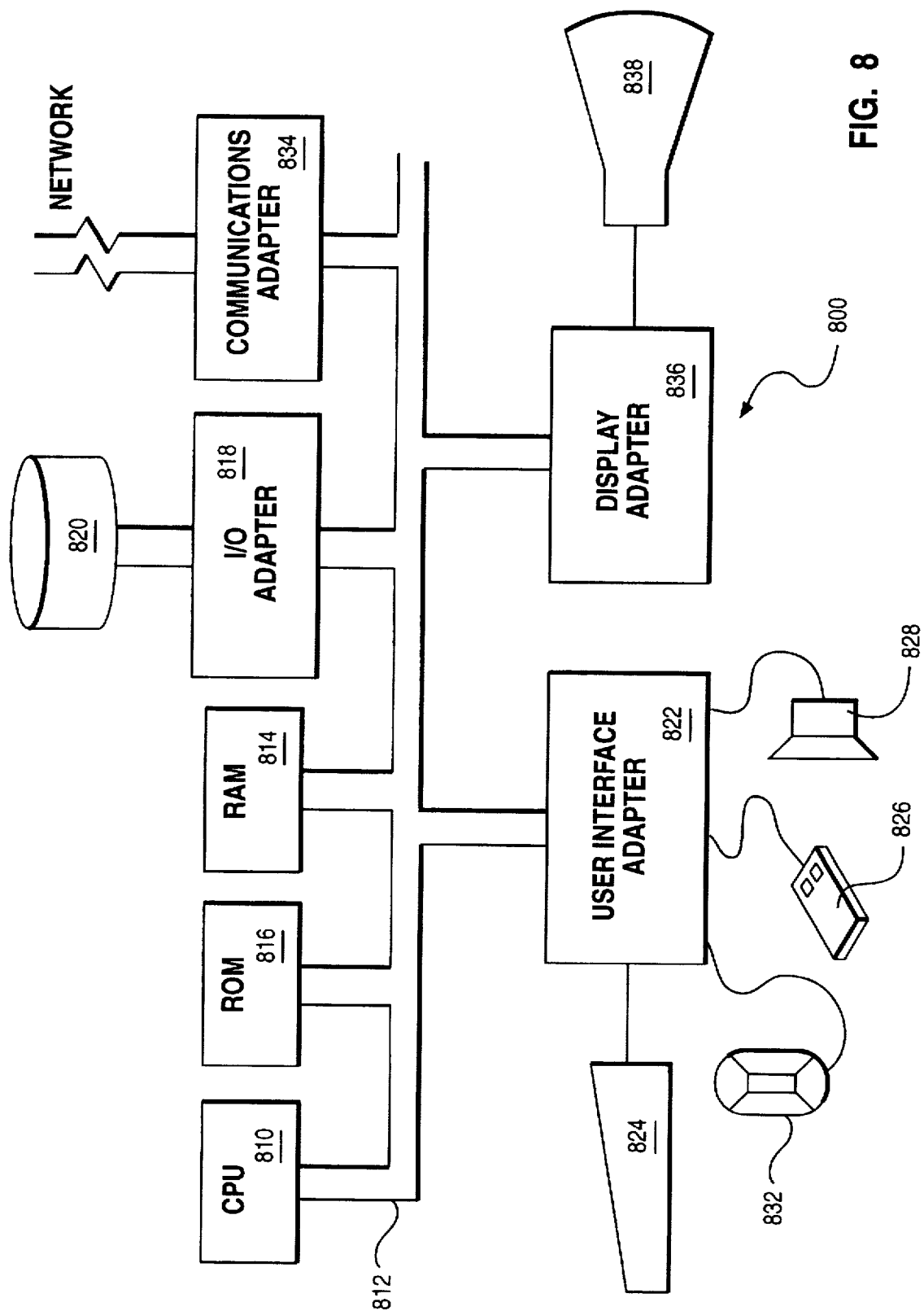
FIG. 8 illustrates a data processing system which may be used for the invention.

Referring first to FIG. 8, an example is shown of a data processing system 800 which may be used for the invention. The system has a central processing unit (CPU) 810, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor User's Manual", 1994, IBM Corporation, which is hereby incorporated herein by reference. The history buffer (not shown) of the present invention is included in CPU 810. The CPU 810 is coupled to various other components by system bus 812. Read only memory ("ROM") 816 is coupled to the system bus 812 and includes a basic input/output system ("BIOS") that controls certain basic functions of the data processing system 800. Random access memory ("RAM") 814, I/O adapter 818, and communications adapter 834 are also coupled to the system bus 812. I/O adapter 818 may be a small computer system interface ("SCSI") adapter that communicates with a disk storage device 820. Communications adapter 834 interconnects bus 812 with an outside network enabling the data processing system to communication with other such systems. Input/Output devices are also connected to system bus 812 via user interface adapter 822 and display adapter 836. Keyboard 824, track ball 832, mouse 826 and speaker 828 are all interconnected to bus 812 via user interface adapter 822. Display monitor 838 is connected to system bus 812 by display adapter 836. In this manner, a user is capable of inputting to the system throughout the keyboard 824, trackball 832 or mouse 826 and receiving output from the system via speaker 828 and display 838. Additionally, an operating system such as AIX ("AIX" is a trademark of the IBM Corporation) is used to coordinate the functions of the various components shown in FIG. 8.

Preferred implementations of the invention include implementations as a computer system programmed to execute the method or methods described herein, and as a computer program product. According to the computer system implementation, data, including sets of instructions for executing the method or methods, are resident in the random access memory 814 of one or more computer systems configured generally as described above. Until required by the computer system, the set of instructions may be stored as a computer program product in another computer memory, for example, in disk drive 820 (which may include a removable memory such as an optical disk or floppy disk for eventual use in the disk drive 820). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

In order to predict the required duration of a project, the following analysis is made of the contemplated project and a number of completed projects which are reasonably similar to the contemplated project. For each project, subsystems are identified which are components of the overall project system design and manufacture.

For each subsystem, risk factors, also referred to as characteristics, are identified which have a potential impact on duration of the conceptualizing, planning and developing effort for the subsystem.

For each risk factor, a number of possible conditions are identified and ranked which describe a degree or extent of risk for the risk factor, and are used as criteria for assessing risk. The possible conditions are mutually exclusive, or at least nearly so, in order that observed or anticipated conditions for the subsystem will most closely correspond to only one of the possible conditions. Thus, risk is assessed by assigning an expected value to the characteristic, according to the ranking of the possible condition that most closely matches the observed or anticipated condition.

Figure 1:
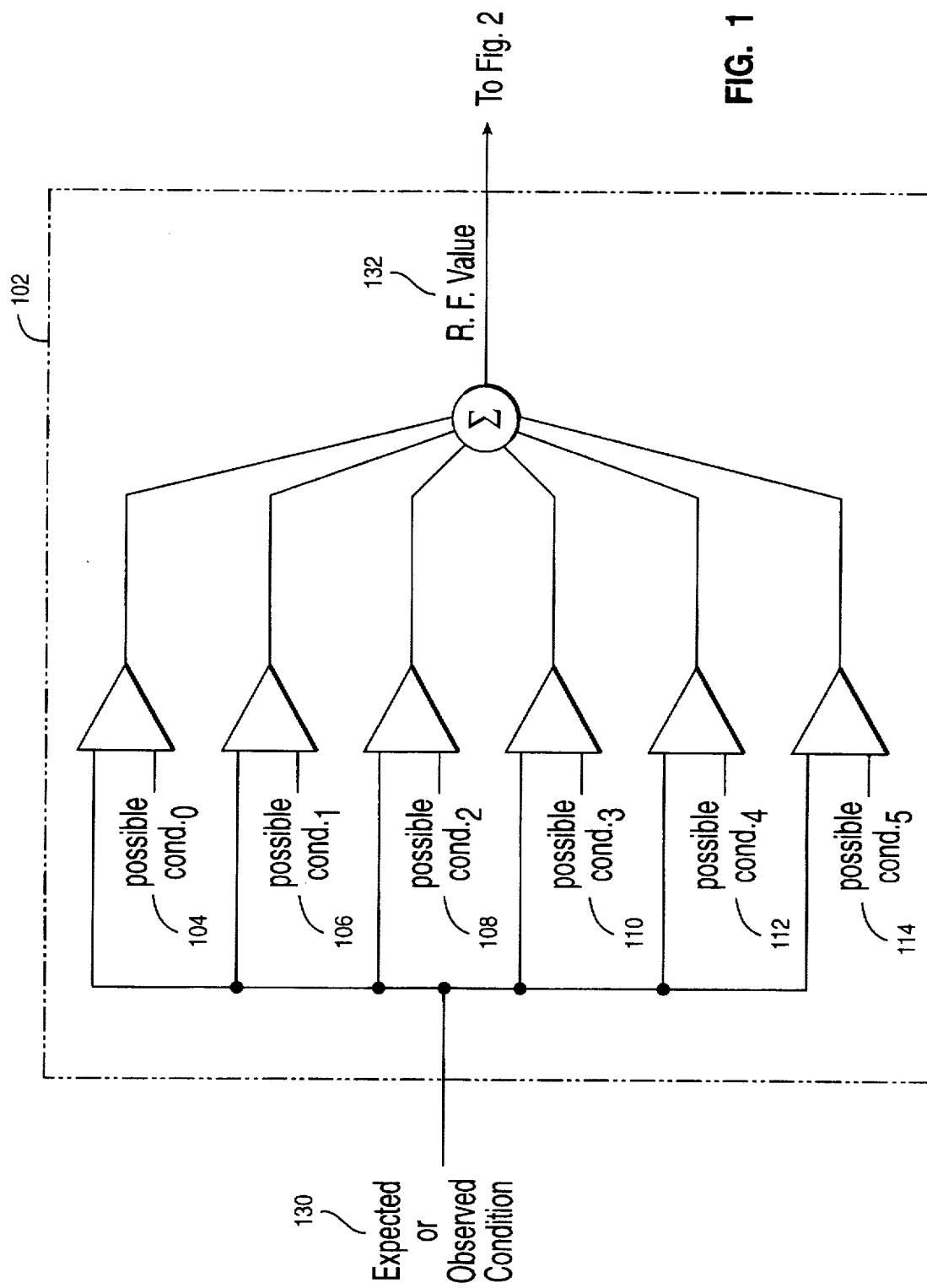
FIG. 1 illustrates risk assessment for subsystems.

FIG. 1 illustrates this risk assessment. For an identified risk factor 102, a number of possible conditions 104, 106, 108, etc. are identified and ranked which present a degree of risk for the factor 102. Values 120, 122, 124, etc. are assigned to the possible conditions 104, etc. in accordance with the rank of the conditions 104, etc. An observed or anticipated condition 130 (an "expected condition") for the subsystem is compared to the identified possible conditions 104, etc. and matched to one of the conditions 104, etc. The corresponding value 120, etc. is assigned to the risk factor 102 as the risk factor value 132. Note that FIG. 1 illustrates the typical risk assessment that is performed for each risk factor.

Next, weights are assigned to the characteristics, according to each one's anticipated degree of impact, and the weights are normalized so that the sum of the weights for a subsystem totals 100. After assigning a risk factor value for each of the risk factors, each value is multiplied by the corresponding weight for the risk factor and the sum of the weighted values is totaled, providing an overall score for the subsystem.

Figure 2:
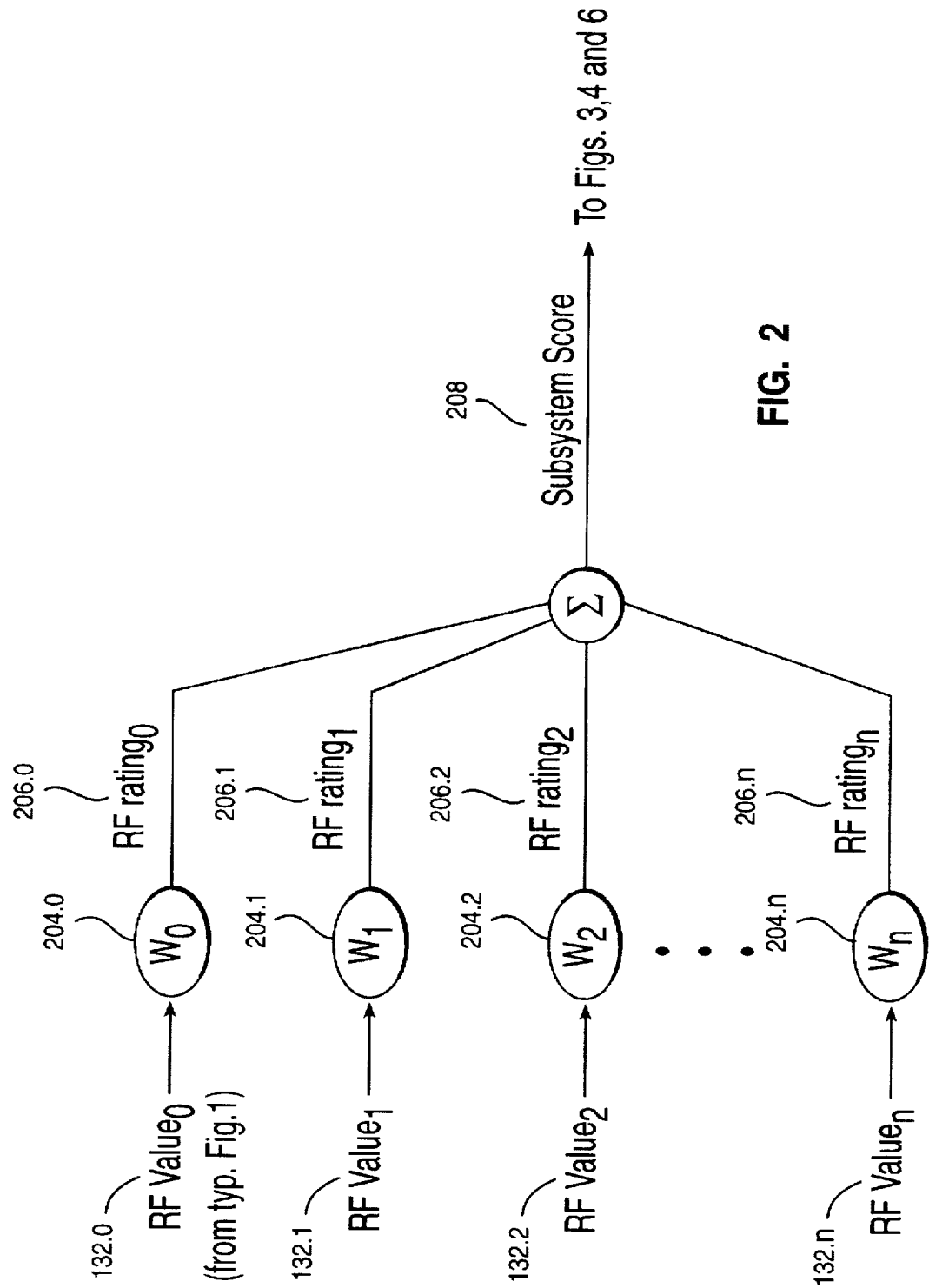
FIG. 2 illustrates weighting of the risk assessment results.

This weighting is illustrated in FIG. 2. Values 132.0 through 132.n are shown for risk factors 0 through n, each as determined in accordance with FIG. 1. Also shown are corresponding weights 204.0 through 204.n. Each value 132 is multiplied by its corresponding weight 204 to yield a risk factor rating 206, and the risk factor ratings 206.0 through 206.n are summed to provide a subsystem score 208. Note that FIG. 2 illustrates the typical weighting that is performed for each subsystem.

Figure 3:
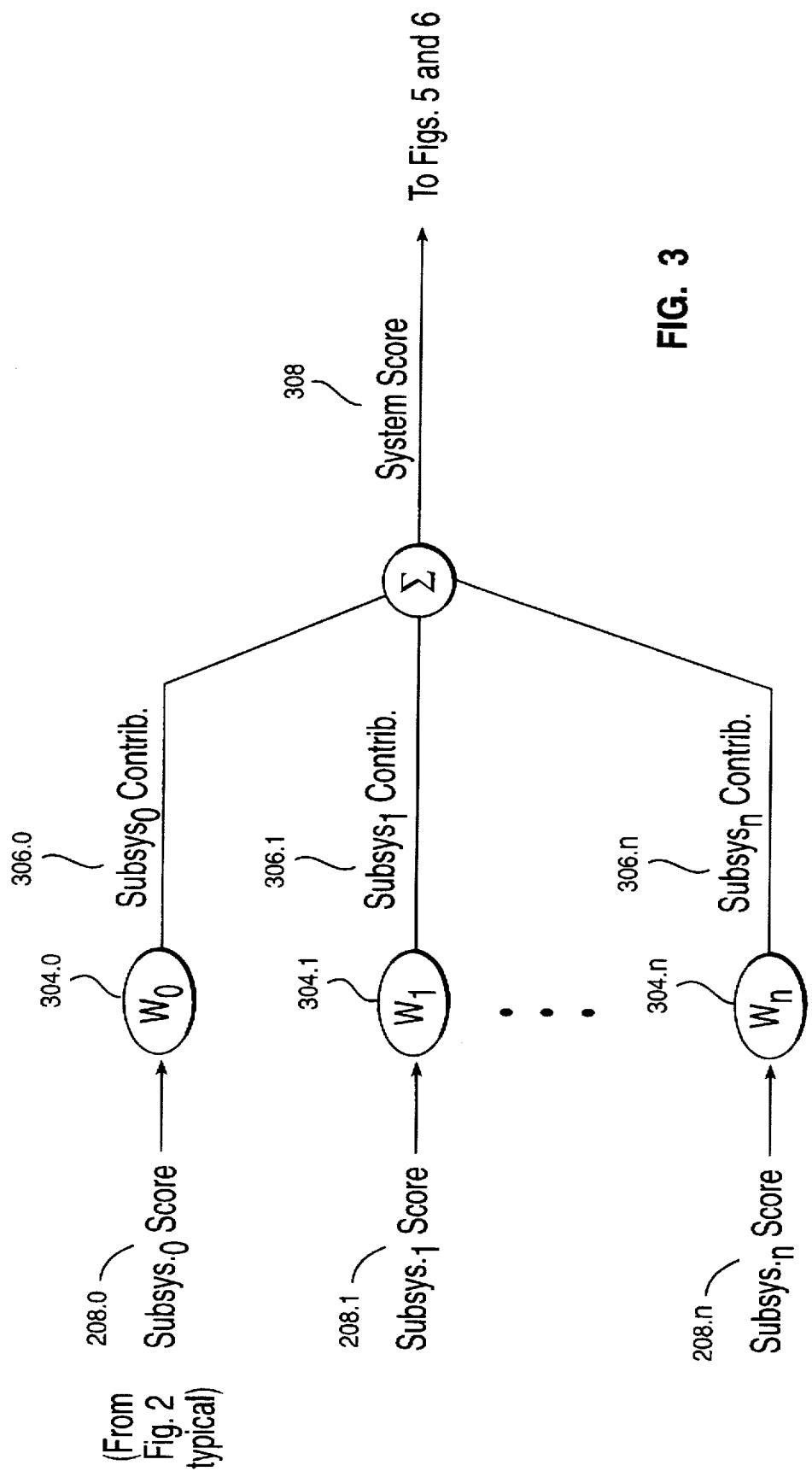
FIG. 3 illustrates combining the weighted risk assessment results for the subsystems.

As shown in FIG. 3, the scores 208 for the subsystems, subsystem0 through subsystemN, are combined to provide a system score. Weights 304 are assigned to each subsystem, according to the anticipated degree of impact of each subsystem on the duration of the qualifying effort for the system, and the subsystem weights are normalized. Each subsystem score 208 is multiplied by the corresponding weight 304 to yield a subsystem contribution 306. The contributions 306 are summed to yield a total system score 308. Note that FIG. 3 illustrates the typical scoring that is performed for each system.

Next, reasonably similar past projects are selected, and certain durations are determined for each of the subsystems and the overall system, including durations for conceptualizing, planning, developing and qualifying phases. Then, regression analysis is performed, such as is known in the art. See, for example, N. R. Draper and H. Smith, *Applied Regression Analysis*, 1981 which is incorporated herein for reference.

Regression analysis, or the method of least squares, as it is also known, is briefly described as follows. A model is selected such as Y=a X+b, where X is the predictor, or independent variable and Y is the predicted, or dependent variable, and a and b are factors in the model. Using actual historical instances of data pairs X and Y, the model factors are then computed so as to minimize the sum of the squares of the differences between the historical values of Y and the values of Y that are predicted from the equation in the model.

Note that "a" is also referred to as the coefficient and "b" as the intercept, in the model. It is also common to omit the intercept, so that the model has only the factor a. There are also many other forms for the model, besides this simple, single independent variable, linear model. In other forms the model may include multiple independent variables and nonlinear functions.

Figure 4:
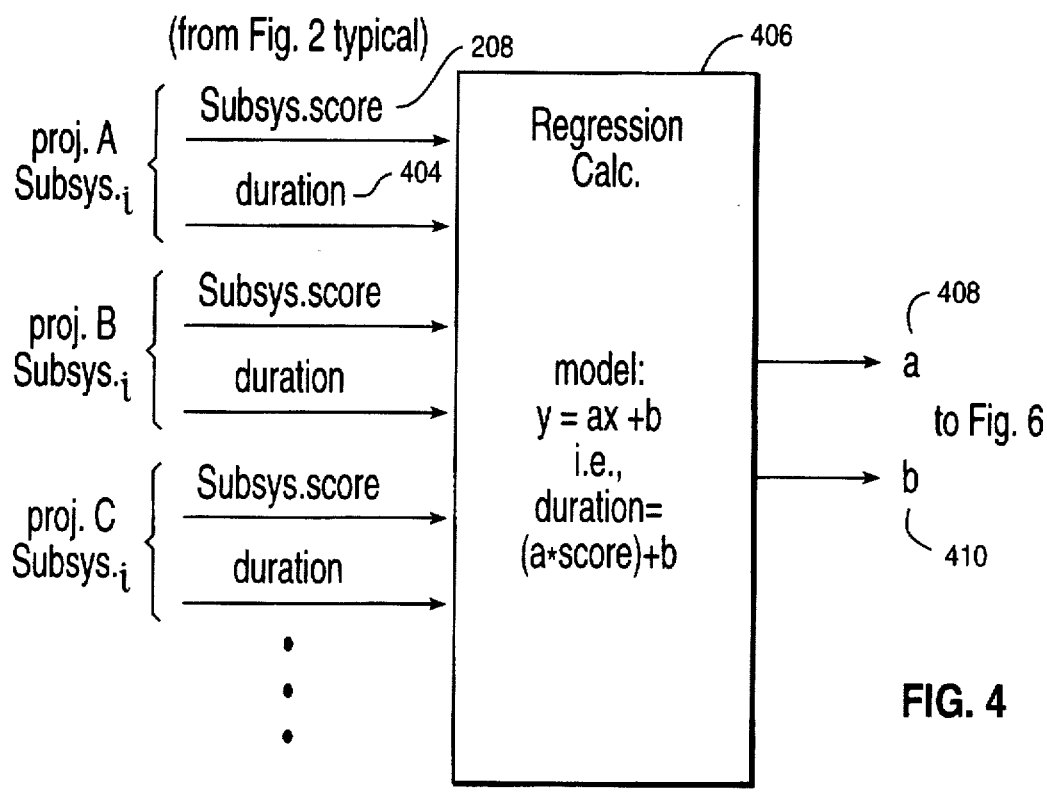
FIG. 4 illustrates computing model factors for past subsystems using the subsystem scores and durations for the conceptualizing, planning and developing phases of the subsystems.

As illustrated in FIG. 4, for like subsystems of the past projects, e.g., project A, project B, project C, etc., subsystem scores 208, such as for a subsystem0, are considered as a predictor variable, X0, for the predicted combined duration, Y0, of a project's conceptualizing, planning and developing phases for the subsystem. (Hereinafter, the term "development" may also be used for any one or more of the activities relating to design and manufacture of a system or subsystem, including conceptualizing, planning, developing and qualifying phases.) The scores 208 are input to the regression calculation 406 along with actual subsystem durations 404. A straight line regression model, $Y0=(a0*X0)+b0$, is used. The regression calculation yields the model coefficient, a0, and intercept, b0. Note that FIG. 4 illustrates the typical regression calculation that is repeated for each of the subsystems.

In a next step (not shown), the weights 204 assigned to the risk factors may be adjusted, if desired, and new model coefficients and intercepts may be calculated for the new subsystem score X0 resulting from the new weights. This step may be repeated to iterate to an improved set of weights 204, such as measured by the residual mean square of the regression analysis.

Figure 5:
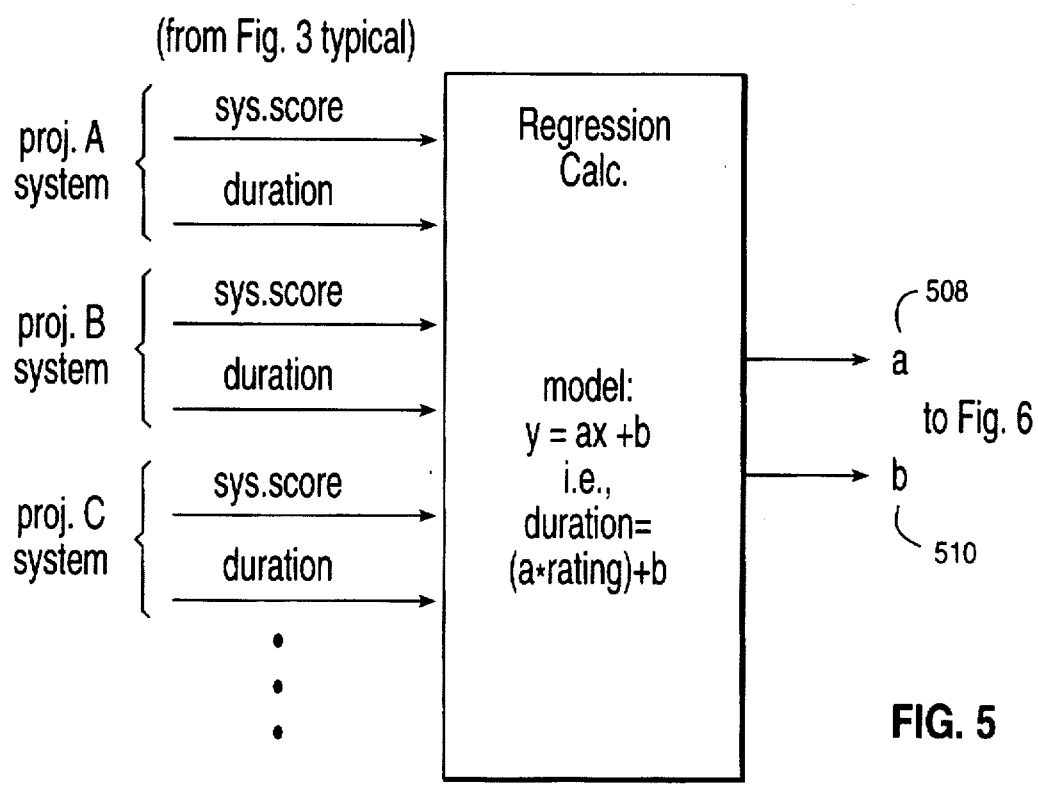
FIG. 5 illustrates computing model factors for past systems using the system scores and durations for the qualifying phase of the systems.

Next, for a number of reasonably similar systems of past projects, e.g., project A, project B, project C, etc., another regression analysis is performed, as illustrated in FIG. 5. The system scores, such as for project A, B, and C systems, is considered as a predictor variable, X, for the actual duration, Y, of a project's qualifying phase for the system, also in a straight line regression model, $Y=a*X+b$. The actual durations for the project A, B, and C systems, similar to current system (shown on FIG. 6) are used with the scores for the project A, B, and C systems in the regression calculation $Y=aX+b$, to determine the model coefficient, a, and intercept, b.

The weights 304 assigned to the subsystems may be adjusted, if desired, and new model coefficients and intercepts may be calculated for the new system score X100 resulting from the new weights. This step may be repeated to iterate to an improved set of weights 204, such as measured by the residual mean square of the regression analysis.

Figure 6:
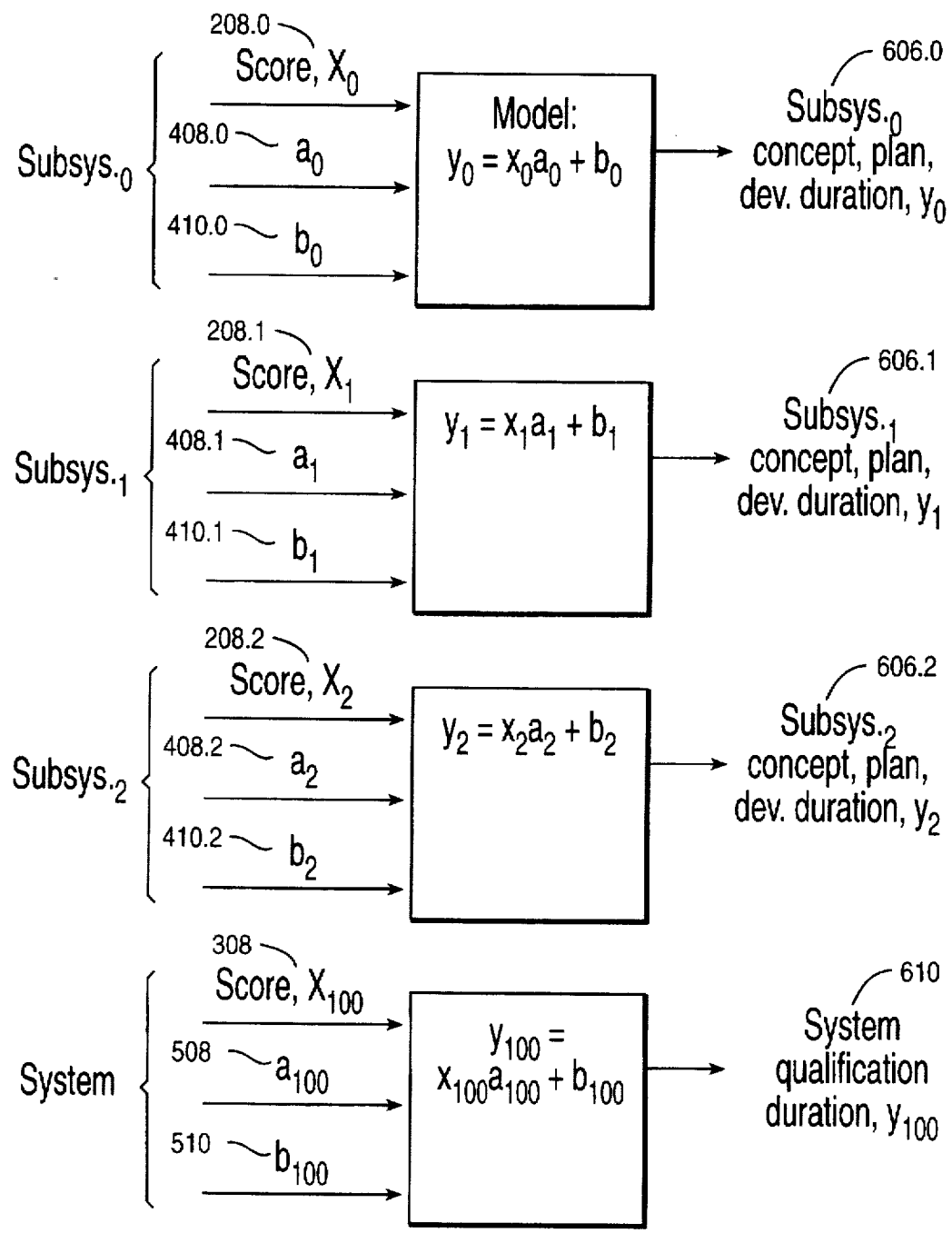
FIG. 6 illustrates, for a current system and its subsystems, computing predicted system and subsystem development durations using the system and subsystem scores and model factors.

Next, as illustrated in FIG. 6, for each subsystem, i.e., subsystem0, subsystem1, etc., of the contemplated project, the calculated subsystem coefficient 408, a, and intercept 410, b, are used with the subsystem score 208, X, in the model, $Y=aX+b$, to perform a prediction calculation 604 yielding the predicted duration 606, Y, of the conceptualizing, planning and developing phases for the subsystem. And, the system score 308, X, of the contemplated project is used with the calculated system coefficient 508, a, and intercept 510, b, in the model, $Y_{100}=aX_{100}+b_{100}$, to perform a prediction calculation 608 yielding the predicted duration 610, Y, of the qualifying phase for the system.

Once the predicted durations have been determined for both the concept, plan and develop phases for the present subsystems and the qualifying phase for the overall present system, the combined duration of the four phases for the overall system may be determined by adding the duration for the system qualification phase to the longest of the subsystem durations for the three earlier phases.

These predictions can then be used in a variety of ways, including altering the design and manufacture of the system by adjusting schedules and conditions to meet known constraints.

As an example of adjusting a schedule, the method and apparatus can be applied to schedule the start date of the contemplated project, given a desired completion date, by applying the predicted duration of the qualifying phase for the system to the completion date, in order to determine a required date for beginning the qualifying phase. Then the start of the component subsystems can be scheduled, knowing the required date for beginning the qualifying phase, and knowing, for each subsystem, the predicted duration for the conceptualizing, planning and developing phases.

Also, if initially expected conditions yield a predicted project duration that exceeds a given limit then changes can be made to improve selected conditions and the resultant predicted duration. That is, different design choices could be made which are not as risky (i.e., matching a condition with a lower value), such as changing die size, selecting more well known packaging or system architecture, etc. Also, the priority/skills/focus condition can be changed, such as by allocating more experienced design personnel to the project, or applying more machinery such as fabrication machinery or computer resources, to lower the risk value. Thus the method and apparatus facilitates and includes selecting and controlling resources, machinery, methods, and materials for transforming the articles used in manufacture from their initial raw state to the finished state of the desired product.

Figure 7A:
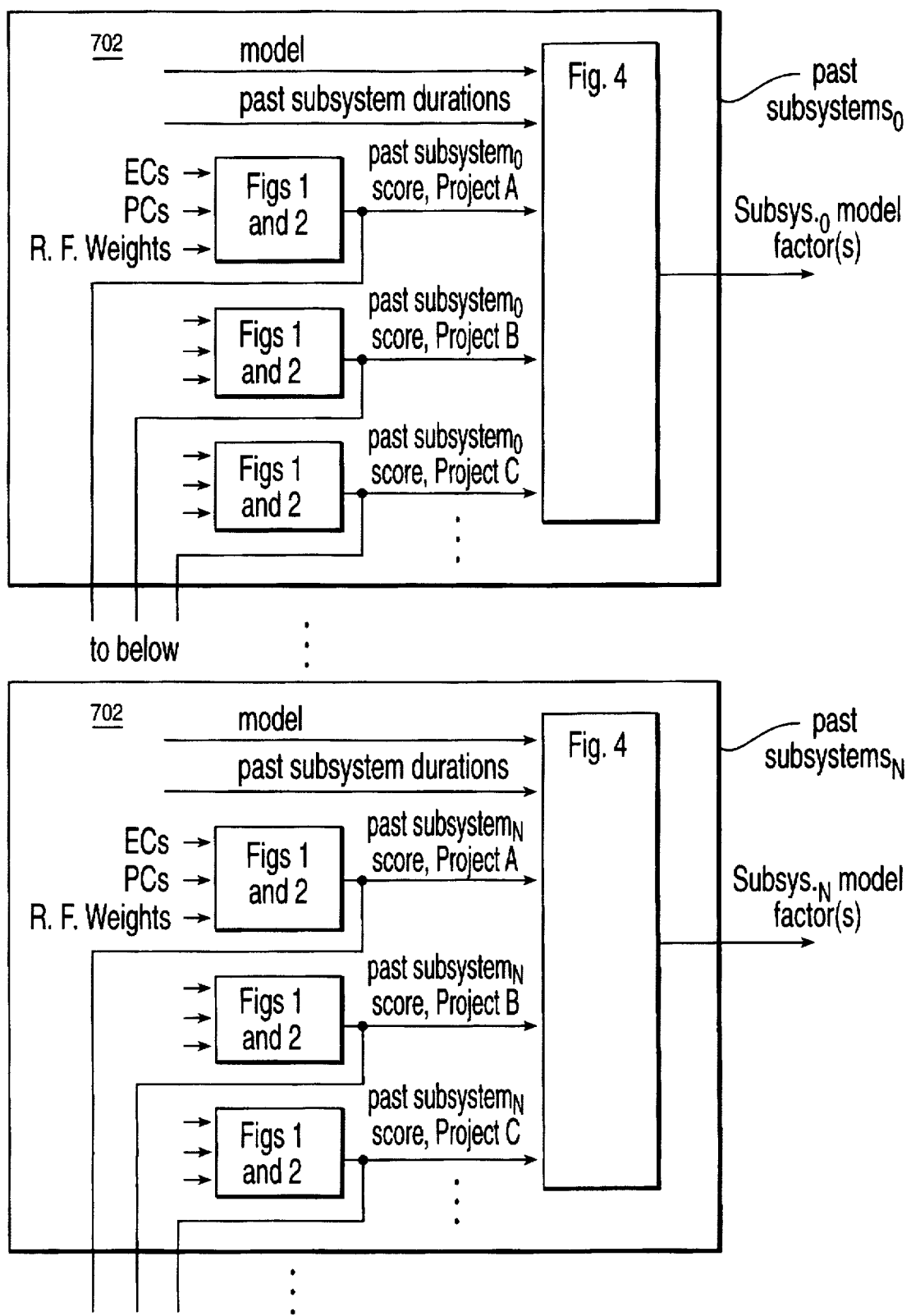
FIG. 7 provides a high level view of an interrelationship between FIGS. 1 through 6 in a typical application of the invention.
Figure 7B:
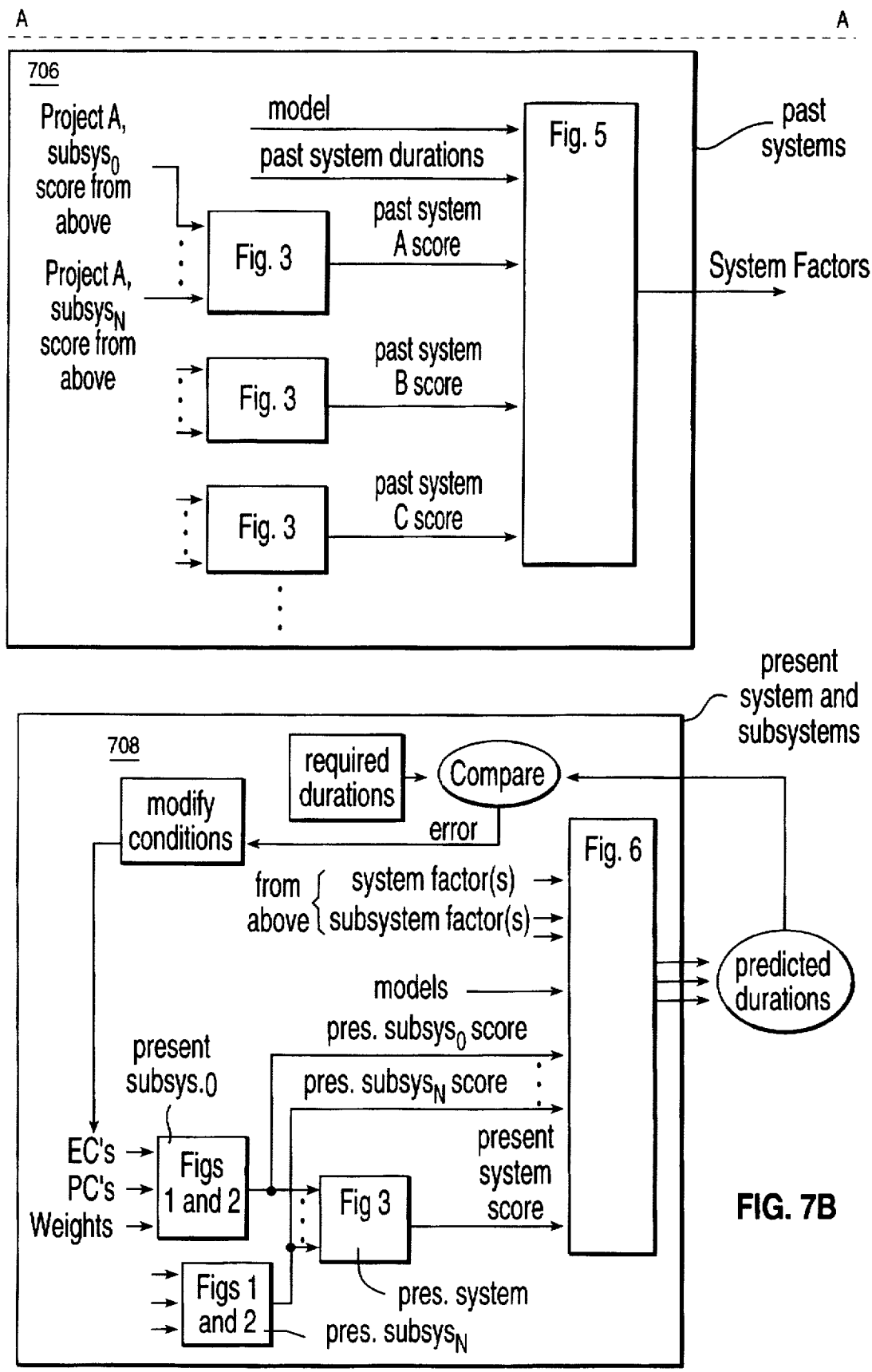

FIG. 7 provides a high level view of an interrelationship between FIGS. 1 through 6 in a typical application of the invention. At 702 and 704 computations are shown, wherein at least one subsystem model factor is computed for each subsystem using past systems 0 through N, according to FIGS. 1, 2 and 4. At 706 computations are shown, wherein at least one system factor is computed using past systems, according to FIGS. 3 and 5. At 708 computations are shown, wherein the subsystem and system activity durations are computed for the present system, according to FIGS. 1, 2, 3, and 6. At 708 is also shown controlling the durations by generating error indications from a comparison of the predicted and required durations, and using the error indication to modify conditions.

The subsystems, risk factors, and weighting factors for the illustrated projects are as follows:

| System | Subsystem | Weight |
|---|---|---|
| System Platform | Processor | 25% |
| | Memory/Bus Controller | 25% |
| | Operating System | 25% |
| | I/O Adapters | 5% |
| | System Design | 20% |

| SubSystem | Risk Factor | Weight |
|---|---|---|
| Processor | Technology | 10% |
| | Microarchitecture | 20% |
| | Cycle time/Circuit Type | 20% |

-continued

|  | | |
|---|---|---|
|  | Die Size/Data Volume | 10% |
|  | Skills/Focus/Priority | 30% |
|  | Requirements Stability | 10% |
| Memory/Bus Controller | Technology | 10% |
|  | Microarchitecture | 20% |
|  | Cycle time/Circuit Type | 20% |
|  | Die Size/Data Volume | 10% |
|  | Skills/Focus/Priority | 30% |
|  | Requirements Stability | 10% |
| Operating System | Install | 15% |
|  | Packaging | 25% |
|  | Kernel Architecture | 35% |
|  | I/O Bus | 10% |
|  | File System Layout | 5% |
|  | Skills/Focus/Priority | 5% |
|  | Requirements Stability | 5% |
| I/O Adapters | Architecture 10% | |
|  | Support ASIC | 30% |
|  | Card/Planar | 10% |
|  | Firmware | 10% |
|  | Skills/Focus/Priority | 30% |
|  | Requirements Stability | 10% |
| System Design | Architecture | 10% |
|  | Support ASICs | 20% |
|  | Firmware | 5% |
|  | Card/Planar | 5% |
|  | Mechanical | 5% |
|  | Manufacturability | 5% |
|  | Skills/Focus/Priority | 20% |
|  | Requirements Stability | 30% |

Definitions of the various phases are as follows:

Concept=Very start of project to demonstration of feasibility and specific proposal.

Plan=End of concept phase to detailed plan and committed schedule.

Develop=End of plan phase to first parts for hardware projects. End of plan phase to end of software functional verification test (FVT) for operating system.

Qualify=End of develop phase to first system general announcement.

Definitions of criteria for assessing the risk factors (i.e., "possible conditions") are as follows including the degree of risk associated with each possible condition:

Management Risk Factors—System Platform and Subsystem Models

Priority/Skills/Focus

5=Lowest Priority Project when competing for resources; and/or very inexperienced team that has never done a similar project before; and/or an unfocused team trying to manage multiple projects at the same time. Generally staffed at levels well below those that were required.

4=Low Priority Project when competing for resources; and/or an inexperienced team that has not done a project together before and only a small percentage of the team has experience on a similar project; and/or key members of the team are stretched across multiple projects. Generally staffed at levels below those that were required.

3=Medium priority Project when competing for resources; and/or a team that has not done a project together before but most team members have experience with a similar project; and/or most key members of the team are focused only on this specific project. Generally staffed at the levels that were required but not allowed flexibility to temporarily go above authorized levels.

2=High priority Project when competing for resources; and/or a team that has not done a project together before but ALL key team members have had experience on similar projects; and/or ALL key members of the team are focused only on this specific project. Generally staffed at the levels that were required AND allowed flexibility to temporarily go above authorized levels.

1=Very high priority Project when competing for resources; and/or a team that has done a similar project together before; and/or ALL members of the team are focused only on this specific project. Generally staffed at the levels that were required AND allowed flexibility to temporarily go above authorized levels with key resources from other projects.

0=A bet-your-business project that has all key resources at its' disposal and is a clear number 1 priority at all levels of the business.

Requirements Stability

5=Significant changes in requirements occur in the 2nd half of the 'Develop' phase of the project.

4=Significant changes in requirements occur in the 1st half of the 'Develop' phase of the project.

3=Some non-trivial changes in requirements occur in the 2nd half of the 'Develop' phase of the project.

2=Some non-trivial changes in requirements occur in the 1st half of the 'Develop' phase of the project.

1=Requirements frozen by end of 'Plan' phase.

0=Requirements frozen by end of 'Concept' phase.

Technical Risk Factors—Processor & Memory/Bus Controller Subsystems

Technology

5=First user part in new technology driving technology T2 date.

4=System GA within 6 months of technology T2.

3=System GA within 12 months of technology T2.

2=System GA within 18 months of technology T2.

1=System GA>18 months from technology T2.

0=Off the shelf part.

Architecture/Microarchitecture

5=State-of-the-art SMP enabled microprocessor/controller implementing a new architecture and/or multiple architectures.

4=State-of-the-art uni microprocessor/controller implementing a new architecture and/or multiple architectures; or a complex (<state-of-the-art) SMP enabled microprocessor implementing a new architecture and/or multiple architectures.

3=A new uniprocessor microarchitecture implementing an existing architecture or a significant delta from an existing SMP enabled microarchitecture.

2=A derivative design from an existing microarchitecture (uni or SMP).

1=Small changes made to an existing microarchitecture (uni or SMP).

0=No changes made to an existing microarchitecture (ie. technology map) or off-the-shelf part.

Cycle Time/Circuit Type

5=State-of-the-art circuit techniques that require brand new tools/methodology to support extremely aggressive cycle time goals.

4=Very aggressive circuit techniques that require significant changes to the methodology/toolset to support aggressive cycle time goals.

3=Circuit techniques that are practiced broadly and require only minor changes to the toolset/methodology to support moderately aggressive cycle time goals.

2=Standard circuit techniques using existing toolset/ methodology to support moderate cycle time goals.

1='Map' of existing design to new technology to realize cycle time improvement from technology.

0=Standard circuit techniques using existing toolset/ methodology to support non-critical cycle time goals or off the shelf part.

Die Size/Data Volume

5=Design is at the die size limits of photo equipment and requires multiple 'diet' plans to fit. Design data volumes break many of the tools and result in extremely long job TAT on other tools.

4=Design bumps up against die size limits and may require a single round of design changes to meet die size. Data volumes break some of the tools and result in long job TAT on some tools.

3=Design is at 80–90% of maximum die area and does not require design changes to fit. Data volumes do not break tools but result in long job TAT on a few tools.

2=Design is at 60–80% of maximum die area and does not require design changes to fit. Data volumes do not break tools and job TAT is less than 1 day for all key tools.

1=Design is less than 60% of the maximum die area and data volumes are not an issue for the existing tools.

0=Off the shelf part.

Technical Risk Factors—I/O Adapters

The technical risk factors for I/O adapters are the same as for system design following.

Technical Risk Factors—System Design

Architecture

5=State-of-the-Art SMP. Significant changes in Architecture to several subsystems (CPU, Mem, I/O)

4=Significant Architectural changes to Two of the key subsystems.

3=Significant changes to One of the subsystems.

2=Simple changes to Several subsystems.

1=Simple changes to One or Two of the subsystems.

0=No Architectural Changes Required.

Support ASICs

5=New Designs required for the Several of the Support ASICS. The designs drive technology (New Technology, Higher Density, New Architecture, Advanced Packaging).

4=New Designs for One or Two of the Support ASICs. The New Designs drive technology.

3=Significant Design Deltas Required on Several of the existing support ASICs.

2=Significant Design Deltas Required One or Two of the support ASICs.

1=Minor Delta on One or Two of the support ASICs.

0=No Change in Support ASICs Required.

Firmware

5=Brand new code for a new State-of-the-Art System. Also Open Firmware Based.

4=Significant changes to existing code base, Open Firmware Based.

3=Slight changes to the existing code base, Open Firmware Based.

2=Significant changes to existing base, unique to one product.

1=Unique changes to existing code, unique to one product.

0=No Changes to Firmware Required.

Card/Planar

5=New State-of-the-Art Card/Planar Design across Multiple Assemblies. Card pushes technology (More Planes, Small Size, Blind Vias, Very High Wire Density, New Packaging New Connection Technology, Advanced Materials, etc.)

4=New State-of-the-Art Card/Planar across One or Two assemblies. Card pushes technology.

3=Significant changes from Current Card/Planar design across Multiple assemblies. Card does not push technology.

2=Significant changes from Current Card/Planar design across One or Two assemblies.

1=Minor Changes to One or Two Card/Planar assemblies.

0=No Changes to Card/Planar Designs.

Mechanical

5=New State-of-the-Art Power, Packaging and Cooling techniques used throughout the system.

4=New State-of-the-Art Power, Packaging or Cooling technique used in the system.

3=Significant modifications to Power, Packaging, and Cooling with at least one of the systems pushing the common practices limit.

2=Significant modifications to the Power, Packaging, and Cooling but none of the modified systems push the envelope.

1=Minor Modifications of Power, Packaging and Cooling systems but modifications use common practices and are not pushing envelope.

0=Uses Already Available Common Parts.

Manufacturability

5=New State-of-the-Art Process/Machinery Required for the Majority of the System and Assemblies.

4=New State-of-the-Art Process/Machinery required for One or Two of the Assemblies.

3=Significant changes to the Existing Process/Machinery required.

2=Moderate change to existing Process/Machinery required.

1=Minor change in Process/Machinery Required.

0=No Changes to Process or Machinery Required.

Technical Risk Factors—Operating Systems

Install

5=Completely new install mechanism. Generally requiring new divisions of the system, new types of packages, and ways of installing them.

4=Very substantial revision to current install mechanisms.

3=Substantial revision to current install mechanisms. Generally requiring new divisions of the system or new types of packages or new ways of installing them.

2=Small revisions to current install mechanisms. Generally not requiring new divisions of the system or new types of packages or new ways of installing them.

1=Minor revisions to current install mechanisms.

0=No revisions to current install mechanisms.

Packaging

5=Completely new packaging of the system. Generally by new install divisions of the system and new types of packages 4=Very substantial revision to the packaging of the system. This could be required by new install divisions of the system or LPPs or new types of packages.

3=Substantial revision to the packaging of the system. Generally required by new install divisions of the system or new types of packages.

2=Small revisions to the packaging of the system. Generally there are no new install divisions of the system or new types of packages, but most or all packages in the system need to be modified.

1=Minor revisions to the packaging of the system. Generally changes are localized to a subset of the system or LPPs.

0=No revisions to the packaging of the system. Generally there are only small changes to current packages and the addition of new packages.

Kernel Architecture

5=Major restructuring of the architecture of the kernel, generally requiring new synchronization mechanisms or complete reorganization of subsystems and/or their interfaces.

Inter-subsystem interfaces are generally impacted.

4=Significant restructuring of the architecture of the kernel, generally requiring new synchronization mechanisms or reorganization of subsystems and/or their interfaces.

3=Substantial restructuring of the architecture of the kernel, generally not requiring new synchronization mechanisms or reorganization of subsystems and/or their interfaces. Most subsystems are impacted.

2=Small restructuring of the architecture of the kernel, not requiring new synchronization mechanisms or reorganization of subsystems and/or their interfaces. Many (but not most) subsystems are impacted.

1=Minor restructuring of the architecture of the kernel, not requiring new synchronization mechanisms or reorganization of subsystems and/or their interfaces. More than one subsystem is impacted by some line items.

0=No revisions to the kernel architecture. Changes are limited to one subsystem for each line item.

I/O Bus

5=Completely new I/O bus supported.

4=New I/O bus supported. The bus is a modification of a currently supported I/O bus.

3=Completely new I/O bus interface chip supported.

2=New I/O bus interface chip supported. The bus interface is a modification of a currently supported bus interface chip.

1=Some change to I/O bus management, but no new I/O bus or I/O bus interface chip.

0=No new I/O bus, new I/O bus management chip, or change to I/O bus management.

Filesystem Layout

5=Complete reorganization of filesystem layout. All files re-examined for placement in new filesystem layout.

4=Substantial reorganization of filesystem layout. Most files re-examined for placement in new filesystem layout.

3=Significant reorganization of filesystem layout. Some files re-examined for placement in new filesystem layout.

2=No reorganization of filesystem layout. All files re-examined for placement in current filesystem layout.

1=No reorganization of filesystem layout. Most files re-examined for placement in current filesystem layout.

0=No reorganization of filesystem layout. Most files not re-examined for placement in current filesystem layout.

Although the present invention and its advantages have been described in detail, it should be understood that various changes, substitutions and alterations can be made without departing from the spirit and scope of the invention as defined by the following claims. For example, the terminology referring to systems and subsystems is somewhat arbitrary. It should be recognized that a subsystem, which is a component of a system, could itself be considered a system. Also, as has been previously pointed out, a variety of models could be employed.

What is claimed is:

1. A computer aided method for estimating duration of activities in forming a current system, wherein data is stored in a memory and processed by the computer, the method comprising the steps of:

a) storing data, comprising: durations of first activities and scores for a number of previously formed, past systems, scores for the current system, and a model having a mathematical expression defining a relationship between duration of the first activities and such scores for the past systems, the mathematical expression including a factor, wherein the factor may be a coefficient in the expression;

b) processing the data to compute a value for the factor in response to the durations and scores for the past systems; and c) processing the data to compute an expected duration for first activities of the current system, wherein the first activities of the current system correspond to the first activities of the past systems, the expected duration being computed in response to the scores for the current system stored in step a), and the value for the factor computed in step b).

2. The method of claim 1, wherein the scoring of such a system comprises defining and scoring subsystems for the system and combining the scores of the subsystems.

3. A computer aided method for estimating duration of activities in forming a current system wherein data is stored in a memory and processed by the computer, the method comprising the steps of:

a) storing data, comprising: durations of first activities and scores for a number of previously formed, past systems, scores for the current system, and a model having a mathematical expression defining a relationship between duration of the first activities and such scores for the past systems, the mathematical expression including a factor, wherein the factor may be a coefficient in the expression;

b) processing the data to compute a value for the factor in response to the durations and scores for the past and c) processing the data to compute an expected duration for first activities of the current system, wherein the first activities of the current system correspond to the first activities of the past systems, the expected duration being computed in response to the scores for the current system stored in step a), and the value for the factor computed in step b);

wherein the stored score of such a system is generated by the step of:

d) defining and scoring subsystems for the system and combining the scores of the subsystems; and wherein the scoring of such a subsystem comprises the steps of:

d1) identifying risks having a potential impact on duration of the activities and assigning weights to the risks;

identifying a number of possible conditions ("PC's") relating to the risks, and associating degrees of the risks with the PC's;

d2) defining a relation between an expected condition ("EC") and the PC's; and d3) computing a score in response to the EC's, relations between EC's and PC's, the degrees of risks associated with the PC's and the weights of the risks.

4. The method of claim 3, comprising the steps of:

e) storing data, comprising: durations of second activities and scores for a number of past subsystems of the previously formed, past systems, scores for current subsystems of the current system, and subsystem models having mathematical expressions defining relationships between duration of the second activities and such scores, the mathematical expression for such a subsystem model including a factor, wherein the factor may be a coefficient in the expression;

f) processing the data to compute values for the factors for the subsystem models in response to the durations and scores for the past subsystems; and g) processing the data to compute expected durations for second activities of the current subsystems, wherein the second activities of the current subsystem correspond to the second activities of the past subsystems, the expected duration being computed in response to the scores for the current subsystem stored in step e), and the values for the subsystemfactors computed in step f).

5. The method of claim 4, comprising the steps of:

combining the durations of the second activities and the first activities for the current system and subsystems to provide an overall duration for the current system.

6. The method of claim 5, wherein the scoring of such a system comprises the steps of:

defining and assigning weights to the subsystems for that system;

combining the scores of subsystems for that system with the subsystem weights.

7. The method of claim 6, wherein the first activities relate to qualifying such systems, and the second activities relate to conception, planning and development of such systems.

8. A program storage device readable by a machine, tangibly embodying a program of instructions executable by the machine to perform method steps for estimating duration of activities in forming a current system, said method steps comprising the steps of:

a) storing data, comprising: durations of first activities and scores for a number of previously formed, past systems, scores for the current system, a model having a mathematical expression defining a relationship between duration of the first activities and such scores for the past systems, the mathematical expression including a factor, wherein the factor may be a coefficient in the expression;

b) processing the data to compute a value for the factor in response to the durations and scores for the past systems; and c) processing the data to compute an expected duration for first activities of the current system, wherein the first activities of the current system correspond to the first activities of the past systems, the expected duration being computed in response to the scores for the current system stored in step a), and the value for the factor computed in step b).

9. The device of claim 8, wherein the scoring of such a system comprises defining and scoring subsystems for the system and combining the scores of the subsystems.

10. A program storage device readable by a machine, tangibly embodying a program of instructions executable by the machine to perform method steps for estimating duration of activities in forming a current system, said method steps comprising the steps of:

a) storing data, comprising: durations of first activities and scores for a number of previously formed, past systems, scores for the current system, a model having a mathematical expression defining a relationship between duration of the first activities and such scores for the past systems, the mathematical expression including a factor, wherein the factor may include a coefficient in the expression;

b) processing the data to compute a value for the factor in response to the durations and scores for the past and c) processing the data to compute an expected duration for first activities of the current system, wherein the first activities of the current system correspond to the first activities of the past systems, the expected duration being computed in response to the scores for the current system stored in step a), and the value for the factor computed in step b);

wherein the stored score of such a system is generated by the step of:

d) defining and scoring subsystems for the system and combining the scores of the subsystems; and wherein the scoring of such a subsystem comprises the steps of:

d1) identifying risks having a potential impact on duration of the activities and assigning weights to the risks;

d2) identifying a number of possible conditions ("PC's") relating to the risks, and associating degrees of the risks with the PC's;

d3) defining a relation between an expected condition ("EC") and the PC's; and d4) computing a score in response to the EC's, relations between EC's and PC's, the rank of the PC's and the weights of the risks.

11. The device of claim 10, wherein the method steps further comprise the steps of:

e) storing data, comprising: durations of second activities and scores for a number of past subsystems of the previously formed, past systems, scores for current subsystems of the current system, and subsystem models having mathematical expressions defining relationships between duration of the second activities and such scores, the mathematical expression for such a subsystem model including a factor, wherein the factor may be a coefficient in the expression;

f) processing the data to compute values for the factors for the subsystem models in response to the durations and scores for the past subsystems; and g) processing the data to compute expected durations for second activities of the current subsystems, wherein the second activities of the current subsystem correspond to the second activities of the past subsystems, the expected duration being computed in response to the scores for the current subsystem stored in step e), and the values for the subsystemfactors computed in step f).

12. The device of claim 11, comprising the steps of:

combining the durations of the second activities and the first activities for the current system and subsystems to provide an overall duration for the current system.

13. The device of claim 12, wherein the scoring of such a system comprises the steps of:

defining and assigning weights to the subsystems for that system;

combining the scores of subsystems for that system with the subsystem weights.

14. The device of claim 13, wherein the first activities relate to qualifying such systems, and the second activities relate to conception, planning and development of such systems.

15. A system for estimating duration of activities in forming a current system, wherein data is stored in a memory and processed by a computer, the system comprising:

a) means for storing data, comprising: durations of first activities and scores for a number of previously formed, past systems, scores for the current system, a model having a mathematical expression defining a relationship between duration of the first activities and such scores for the past systems, the mathematical expression including a factor, wherein the factor may be a coefficient in the expression;

b) means for processing the data to compute a value for the factor in response to the durations and scores for the past systems; and c) means for processing the data to compute an expected duration for first activities of the current system, wherein the first activities of the current system correspond to the first activities of the past systems, the expected duration being computed in response to the scores for the current system stored in step a), and the value for the factor computed in step b).

16. The system of claim 15, comprising scoring means for defining and scoring subsystems for the system and combining the scores of the subsystems.

17. A system for estimating duration of activities in forming a current system, wherein data is stored in a memory and processed by a computer, the system comprising:

a) means for storing data, comprising: durations of first activities and scores for a number of previously formed, past systems, scores for the current system, a model having a mathematical expression defining a relationship between duration of the first activities and such scores for the past systems, the mathematical expression including a factor, wherein the factor may be a coefficient in the expression;

b) means for processing the data to compute a value for the factor in response to the durations and scores for the past systems;

c) means for processing the data to compute an expected duration for first activities of the current system, wherein the first activities of the current system correspond to the first activities of the past systems, the expected duration being computed in response to the scores for the current system stored in step a), and the value for the factor computed in step b); and d) scoring means for defining and scoring subsystems for the system and combining the scores of the subsystems;

wherein the scoring means comprises:

d1) means for identifying risks having a potential impact on duration of the activities and assigning weights to the risks;

d2) means for identifying a number of possible conditions ("PC's") relating to the risks, and associating degrees of the risks with the PC's;

d3) means for defining a relation between an expected condition ("EC") and the PC's; and d4) means for computing a score in response to the EC's, relations between EC's and PC's, the rank of the PC's and the weights of the risks.

18. The system of claim 17, comprising:

e) means for storing data, the data comprising: durations of second activities and scores for a number of past subsystems of the previously formed, past systems, scores for current subsystems of the current system, and subsystem models having mathematical expressions defining relationships between duration of the second activities and such scores, the mathematical expression for such a subsystem model including a factor, wherein the factor may be a coefficient in the expression;

f) means for processing the data to compute values for the factors for the subsystem models in response to the durations and scores for the past subsystems; and g) means for processing the data to compute expected durations for second activities of the current subsystems, wherein the second activities of the current subsystem correspond to the second activities of the past subsystems, the expected duration being computed in response to the scores for the current subsystem stored in step e), and the values for the subsystem factors computed in step f).

19. The system of claim 18, comprising:

means for combining the durations of the second activities and the first activities for the current system and subsystems to provide an overall duration for the current system.

20. The system of claim 19, wherein the scoring means comprises:

means for defining and assigning weights to the subsystems for that system;

means for combining the scores of subsystems for that system with the subsystem weights.

21. The system of claim 20, wherein the first activities relate to qualifying such systems, and the second activities relate to conception, planning and development of such systems.

* * * * *